United States Patent
Zweighaft et al.

(10) Patent No.: US 6,581,865 B1
(45) Date of Patent: Jun. 24, 2003

(54) RETRACTING DOOR ASSEMBLY

(75) Inventors: James Zweighaft, Boulder, CO (US); David T. Hoge, Westminister, CO (US)

(73) Assignee: Quantum Corporation, Milpitas, CA (US)

( * ) Notice: Subject to any disclaimer, the term of this patent is extended or adjusted under 35 U.S.C. 154(b) by 4 days.

(21) Appl. No.: 10/051,587

(22) Filed: Jan. 18, 2002

(51) Int. Cl.$^7$ ............................................. G11B 23/107
(52) U.S. Cl. ........................................ 242/348; 360/132
(58) Field of Search .......................... 242/348, 348.2, 242/347, 347.1, 347.2; 360/132

(56) References Cited

U.S. PATENT DOCUMENTS

| | | | | |
|---|---|---|---|---|
| 4,045,821 A | * | 8/1977 | Fujikura | 360/132 |
| 5,430,587 A | * | 7/1995 | Engan | |
| 5,610,789 A | * | 3/1997 | Miller | 360/132 |
| 5,868,333 A | * | 2/1999 | Nayak | 242/348.2 |
| 6,111,725 A | * | 8/2000 | Christie | 360/132 |
| 6,125,012 A | * | 9/2000 | Miyazaki et al. | 360/132 |
| 6,488,223 B1 | * | 12/2002 | Hayashi | 242/348 |

* cited by examiner

Primary Examiner—William A. Rivera

(57) ABSTRACT

A retracting door assembly that overcomes the requirement for providing excessive area within the tape drive for the retracting door to open and close and for the retracting door during operation. When the tape cartridge is inserted into the tape drive, an engaging apparatus pivotally attached to the retracting door makes contact with the indentation in the tape drive. As the tape cartridge is inserted further into the tape drive, the engaging apparatus is pushed into the tape cartridge and draws the pivotally attached retracting door into the tape cartridge. Drawing the retracting door into the tape cartridge while it is opening reduces the arch the retracting door travels internal to the tape drive as it is opening, thus reducing the area within the tape drive required for operation.

10 Claims, 4 Drawing Sheets

RETRACTING DOOR ASSEMBLY

FIELD OF THE INVENTION

The invention relates to digital tape drive storage devices, and in particular, to a retracting door assembly for use in a single reel tape cartridge to reduce the area required within the tape drive for opening the door.

PROBLEM

It is a problem in the field of single reel tape cartridges to protect the magnetic tape when the tape cartridge is not in use while providing a method for accessing the magnetic tape when the tape cartridge is inserted into the tape drive without requiring excessive area within the tape drive for the door to open. Digital data is stored on magnetic tape utilizing a variety of designs, but in all cases, magnetic tape is wound between a pair of tape reels as data is transferred to or from the magnetic tape. In the art of data storage, the physical space required to store data is an important concern. To conserve space, tape drives often use a single reel cartridge design. The single reel design utilizes a supply reel located within the tape cartridge and a take up reel located within the tape drive. A length of magnetic tape for storing digital data is wound on the supply reel. After the tape cartridge is inserted into the tape drive, the magnetic tape is connected to the takeup reel and wound along a tape path internal to the tape drive.

One example for connecting the magnetic tape located within the tape cartridge to the takeup reel located within the tape drive utilizes a flexible leader tab having a closed loop at the end. The leader tab is attached to the end of the length magnetic tape wound on the supply reel within the tape cartridge. As the tape cartridge is inserted into the tape drive, the tape cartridge door automatically opens and the leader tab obtrudes from the tape cartridge. A leader load mechanism located within the tape drive catches the leader tab closed loop and pulls the leader tab and attached magnetic tape toward the takeup reel along the tape path. The leader load mechanism attaches the leader tab to the takeup reel and the tape drive is ready for operation.

In its normal position, the flexible leader tab obtrudes from the tape cartridge. The leader tab is retracted into the tape cartridge when the door is closed. Thus, the door assembly performs the functions of retracting the leader tab following usage and protecting the leader tab and attached magnetic tape media while the tape cartridge is not in use. The typical solution to the problem has been a door assembly that automatically opens as the tape cartridge is inserted into the tape drive.

Horizontally Pivoting Door

One known door assembly employs a door that pivots horizontally and includes a catch that corresponds to a stop in the tape drive. As the tape cartridge is inserted into the tape drive, the catch makes contact with the indentation in the tape drive causing the door to pivot to the open position. Once open, the door remains within the tape drive during operation. As the pivoting door opens, it arcs through approximately a quarter circular profile. The door assembly just described requires internal tape drive space for the door to horizontally pivot between the open and closed position and area for the opened door during operation.

Vertically Pivoting Door

Another known door assembly incorporates a vertically pivoting door. This design requires additional space within the tape cartridge for the door in its open position. The height of the tape cartridge is dictated by the space required for the magnetic tape and for the opened door. Likewise, the height of the tape drive is influenced by the height of the tape cartridge and the drive mechanism located beneath the inserted tape cartridge.

The tape cartridge door assemblies just described influence the size of the tape drive. The horizontally pivoting door influences the tape drives length while the vertically pivoting door influences the tape drive height.

Sliding Door

Yet another door assembly includes a sliding door, reducing the area required for both opening and stowing the door during use. This design is neither practical for all types of tape cartridge nor compatible with all tape drives. Single reel tape cartridges include a flexible leader tab connected to the end of the tape media. The leader tab must be accessible to the leader load mechanism for operation. Existing tape drives for single reel tape cartridges having a sliding door open the door by sliding the door to the right. The flexible leader tab obtrudes toward the right side of the tape cartridge. The leader load mechanism catches the leader tab, then pulls the leader tab and attached magnetic tape left toward the takeup reel. For compatibility with existing tape drives, the sliding door assembly would have to slide right to open and left to close, catching the leader tab when closing. For the reason just discussed, the sliding door assembly is not compatible with existing single reel tape drives.

For these reasons, a need exists for a retracting door assembly that does not require excessive area within the tape drive to open the door and for the door during operation.

Solution

The present retracting door assembly overcomes the problems outlined above and advances the art by providing a retracting door assembly that requires less internal tape drive area for the door to pivot open, less area required for the opened door during operation and is compatible with existing tape drives that utilize single reel tape cartridges with a horizontally pivoting door assembly.

For compatibility with existing single reel tape drives, a retracting door assembly that pivots at least partially internal to the tape cartridge reduces the area required inside the tape drive for pivoting the door between the open and closed positions. Similarly, retaining the door internal to the tape cartridge during operation reduces tape drive length.

An apparatus for drawing the retracting door into the tape cartridge is an engaging apparatus that is pushed into the tape cartridge as the tape cartridge is inserted into the tape drive. A hinge or similar pivoting apparatus attaching the retracting door to the engaging apparatus allows the retracting door to also be drawn into the tape cartridge. The hinge and a portion of the retracting door are drawn into the cartridge as the retracting door pivots to the open position, thereby reducing the arc of motion as the retracting door opens within the tape drive.

The retracting door assembly just described includes tracks, such as a cam, along the internal top and bottom surface of the tape cartridge for the engaging apparatus, a hinge and a retracting door. Addition of a guide adjacent to the tracks provides a method for controlling the arc of motion the retracting door travels internal to the tape drive.

Varying the distance between the guide and the tracks changes the arc of motion the retracting door travels as it opens. As the distance between the guide and the track increases, the hinge is drawn further into the tape cartridge as the door pivots open. Drawing the hinge further into the tape cartridge reduces the internal tape drive area required to open the retracting door. Likewise, drawing the retracting door internal to the tape cartridge reduces the area required within the tape drive for the opened retracting door during operation.

The combination of an engaging apparatus pivotally attached to the retracting door and tracks for guiding the retracting door assembly into the tape cartridge as the tape cartridge is inserted into the tape drive reduces the internal tape drive area required for operation.

DETAILED DESCRIPTION

The retracting door assembly summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

Figure 3:
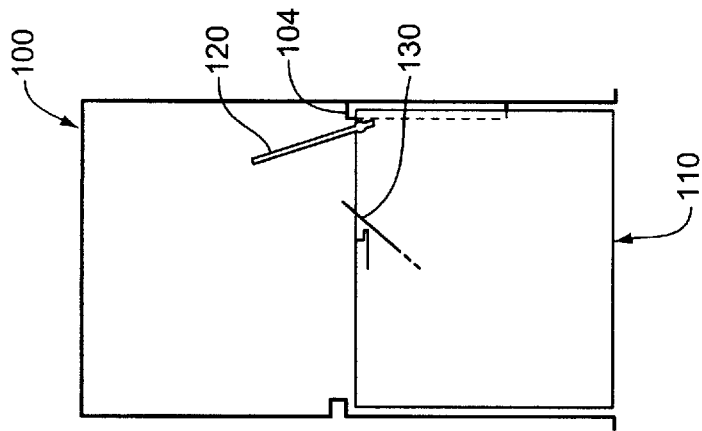
FIG. 3 illustrates a top view of a prior art single reel tape cartridge fully inserted into a tape drive.
Figure 2:
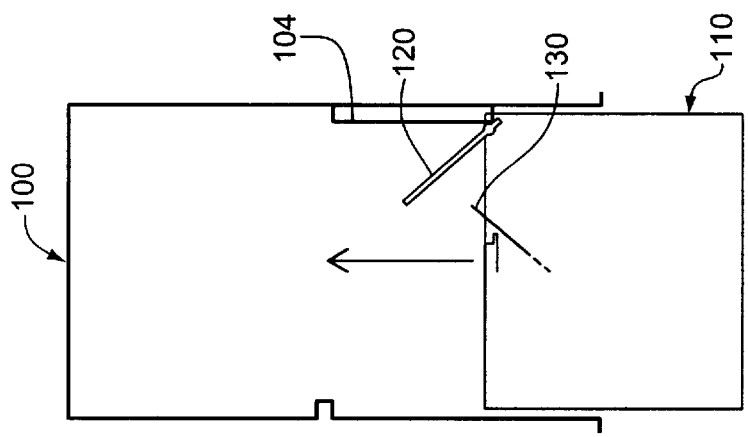
FIG. 2 illustrates a top view of a prior art single reel tape cartridge partially inserted into a tape drive.
Figure 1:
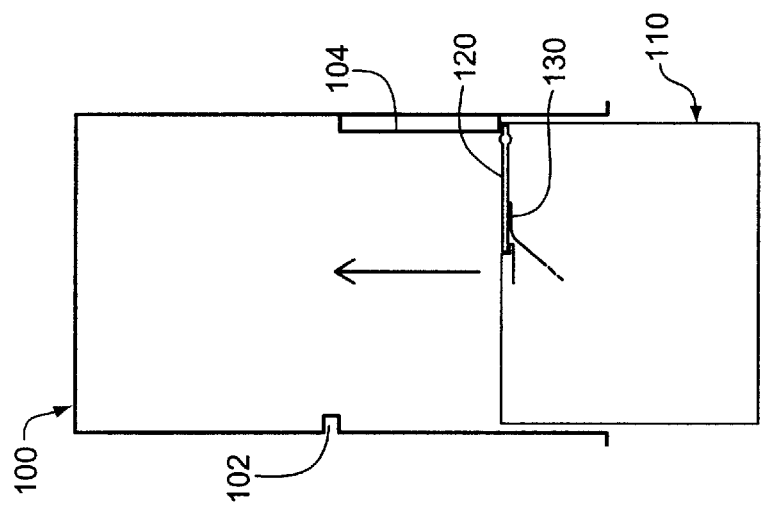
FIG. 1 illustrates a top view of a tape drive and single reel tape cartridge of the prior art.

Prior Art—FIGS. 1–3

Operation of the pivoting door assembly of a single reel tape cartridge, such as a DLT style tape cartridge, is illustrated in FIGS. 1–3. Tape drive 100 includes an internal stop 102 on the left side to prevent the tape cartridge 110 from being inserted too far into the tape drive and includes a corresponding inward indentation 104 on the right side to provide a means for opening pivoting door 120. As tape cartridge 110 is inserted into tape drive 100, the edge of pivoting door 120 makes contact with indentation 104 on the side of tape drive 100, shown in FIG. 2, causing pivoting door 120 to pivot open and leader tab 130 to obtrude. When tape cartridge 110 is fully inserted, shown in FIG. 3, pivoting door 120 remains open along the right side of tape drive 100. Similarly, as tape cartridge 110 is extracted pivoting door 120 pivots closed, retracting leader tab 130 into tape cartridge 110. The pivoting door assembly operation just described requires excessive area within the tape drive for opening and closing the pivoting door.

The present retracting door assembly overcomes the requirement for providing excessive area within the tape drive for the retracting door to open and close and for the retracting door during operation. When the tape cartridge is inserted into the tape drive, an engaging apparatus pivotally attached to the retracting door makes contact with the indentation in the tape drive. As the tape cartridge is inserted further into the tape drive, the engaging apparatus is pushed into the tape cartridge. As the engaging apparatus is pushed into the tape cartridge, it draws the pivotally attached retracting door into the tape cartridge. Drawing the retracting door into the tape cartridge while it is opening reduces the arch the retracting door travels internal to the tape drive as it is opening, thus reducing the area within the tape drive required for operation.

Retracting Door Assembly—FIGS. 4–8

The retracting door assembly provides a location for the retracting door internal to the tape cartridge to reduce the area required within the tape drive for the retracting door during operation. The retracting door assembly also provides a method for reducing the area required inside the tape drive for horizontally pivoting the retracting door open to expose the leader tab for operation.

Referring to FIG. 3, the major components of the present retracting door assembly are a retracting door 220 to enclose the magnetic tape and to retract leader tab 230, a means for pivoting 224 the retracting door and an engaging means 244 for drawing retracting door 220 into tape cartridge 210 as tape cartridge 210 is inserted into tape drive 200. Engaging means 244 is pivotally attached to retracting door 220 such that when engaging means 244 makes contact with indentation 214 in tape drive 200, retracting door 220 begins to pivot to an open position.

The present retracting door assembly further comprises an internal means for guiding 262 engaging means 244 and retracting door 220 into tape cartridge 210. The guiding means 262 has a profile located on the top and bottom interior surface of tape cartridge 200 housing. The engaging means 244 and pivotally attached retracting door 220 follow guiding means 262 profile when engaging means 224 and retracting door 220 are pushed into tape cartridge 210. Guiding means 262 should be of sufficient length for both engaging means 244 and retracting door 220 during operation. One end of the guiding means provides a means for closing (not shown) the retracting door when the tape cartridge is removed from the tape drive. The guiding means can be one or more tracks or cams molded into the top and bottom internal surface of the tape cartridge housing.

In another embodiment of the retracting door assembly, guide 280 limits the distance retracting door 220 enters tape cartridge 210 before pivoting open. Guide 280 can be integrally connected to track 262 or to the tape cartridge 210 housing adjacent to track 262.

Figure 6:
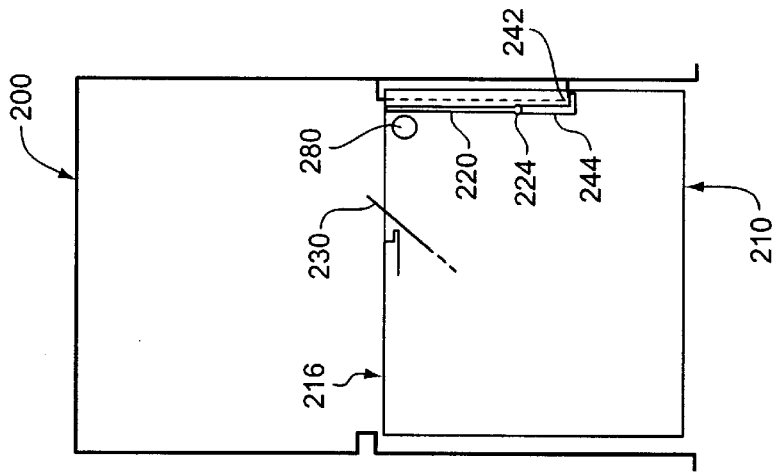
FIG. 6 illustrates a top view of an embodiment of the retracting door assembly with the retractor door fully opened.
Figure 5:
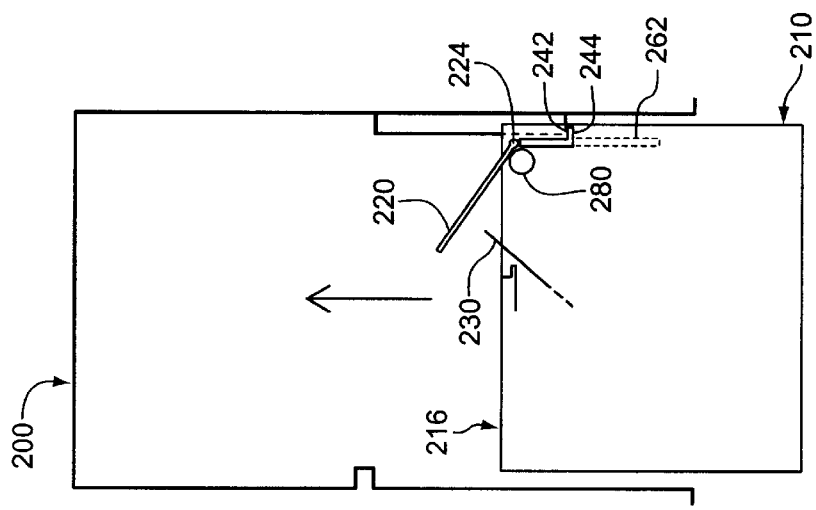
FIG. 5 illustrates a top view of an embodiment of the retracting door assembly with the retractor door partially open.
Figure 4:
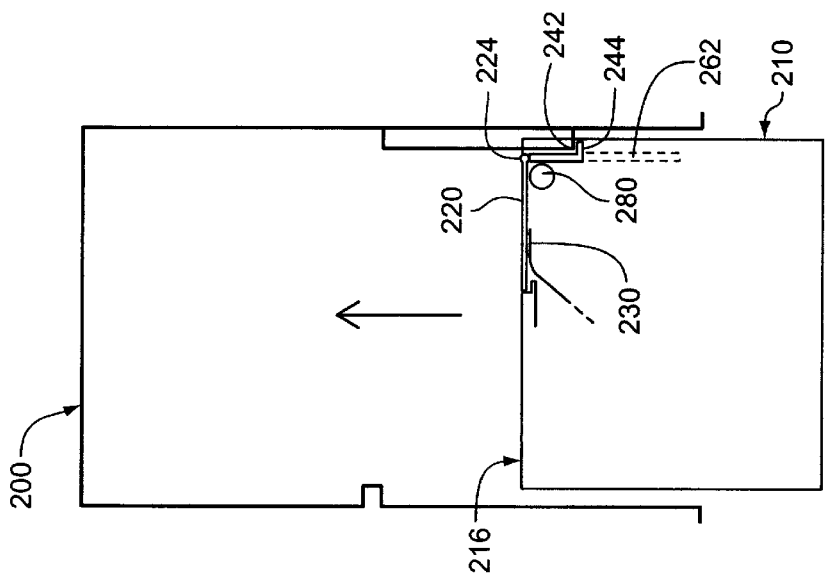
FIG. 4 illustrates a top view of another embodiment of the retracting door assembly with the retractor door closed.

Opening and Closing Operations—FIGS. 4–6

Referring again to FIG. 4, in an embodiment of the present retracting door assembly the engaging means is I-shaped member 244 that is pivotally connected to retracting door 220 by hinge 224 and the guiding means is track 262. The top and bottom of hinge 224 interfaces with one end of track 262 when retracting door 220 is closed. As illustrated in FIG. 5, when tape cartridge 220 is inserted into tape drive 200, tape drive indentation 214 comes into contact with I-shaped member 244. Referring to FIG. 6, as tape cartridge 210 is inserted further into tape drive 200, I-shaped member 244 is pushed along track 262 a corresponding distance, drawing hinge 224 and retracting door 220 further along track 262 into tape cartridge 210 as retracting door 220 pivots clockwise toward an open position. When tape cartridge 210 is fully inserted into tape drive 200, I-shaped member 244 is pushed further into tape cartridge 210, drawing hinge 224 and retracting door 220 further into the tape cartridge 210 and pivoting retracting door 220 to a full open position as retracting door 220 is drawn into tape cartridge 210.

In yet another embodiment of the retracting door assembly, guide 280 limits the distance retracting door 220 enters tape cartridge 210 before pivoting open. Guide 280 can be integrally connected to track 262 or to the tape cartridge 210 housing adjacent to track 262. Changing the distance between guide 280 and track 262 can be used to modify the curvature of the arc of motion traveled as when retracting door 14 pivots to an open position.

Figure 8:
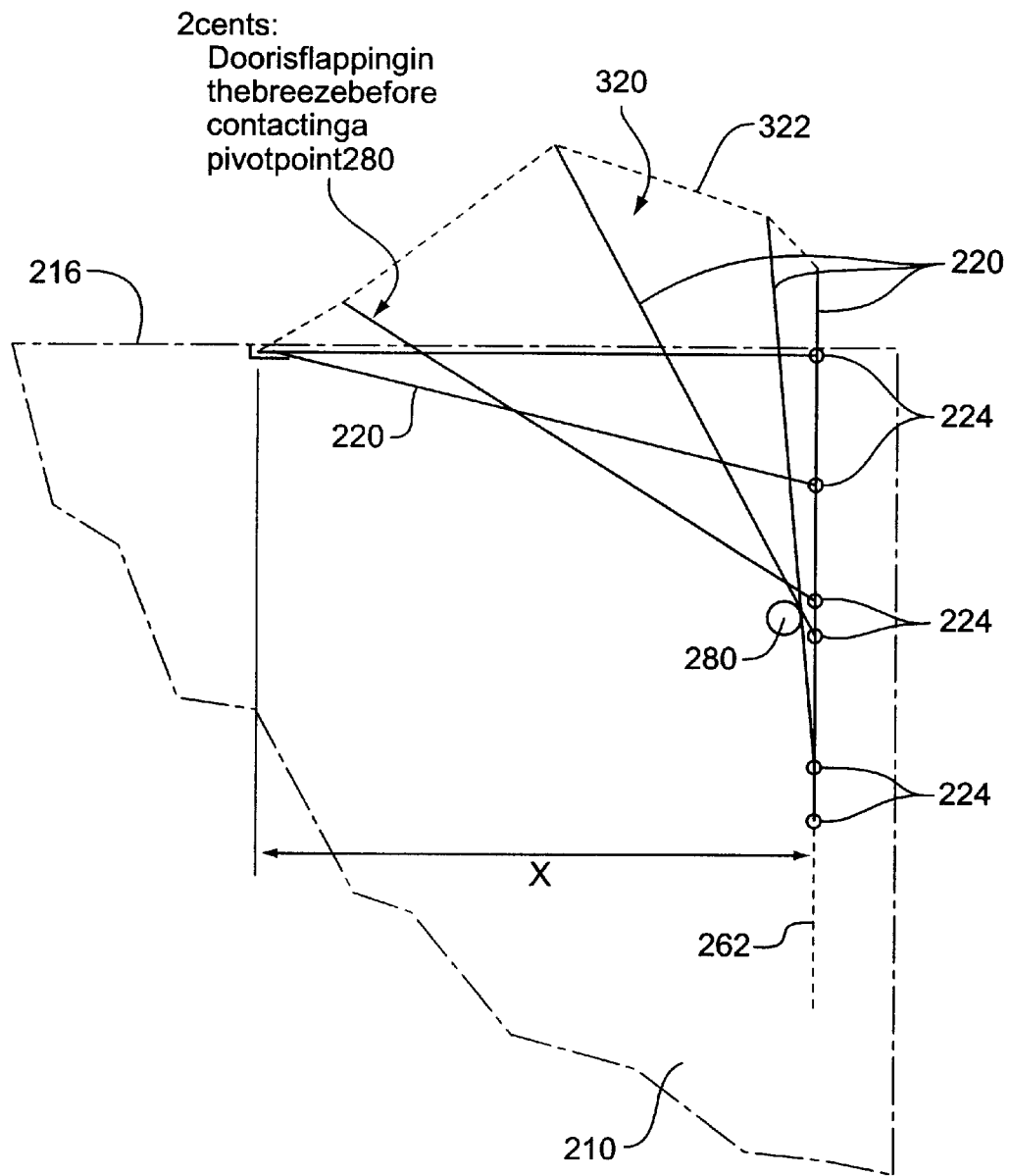
FIG. 8 illustrates a graphical representation of an arch of motion of another embodiment of the retracting door assembly.

Arc of Motion—FIGS. 8–9

Figure 7:
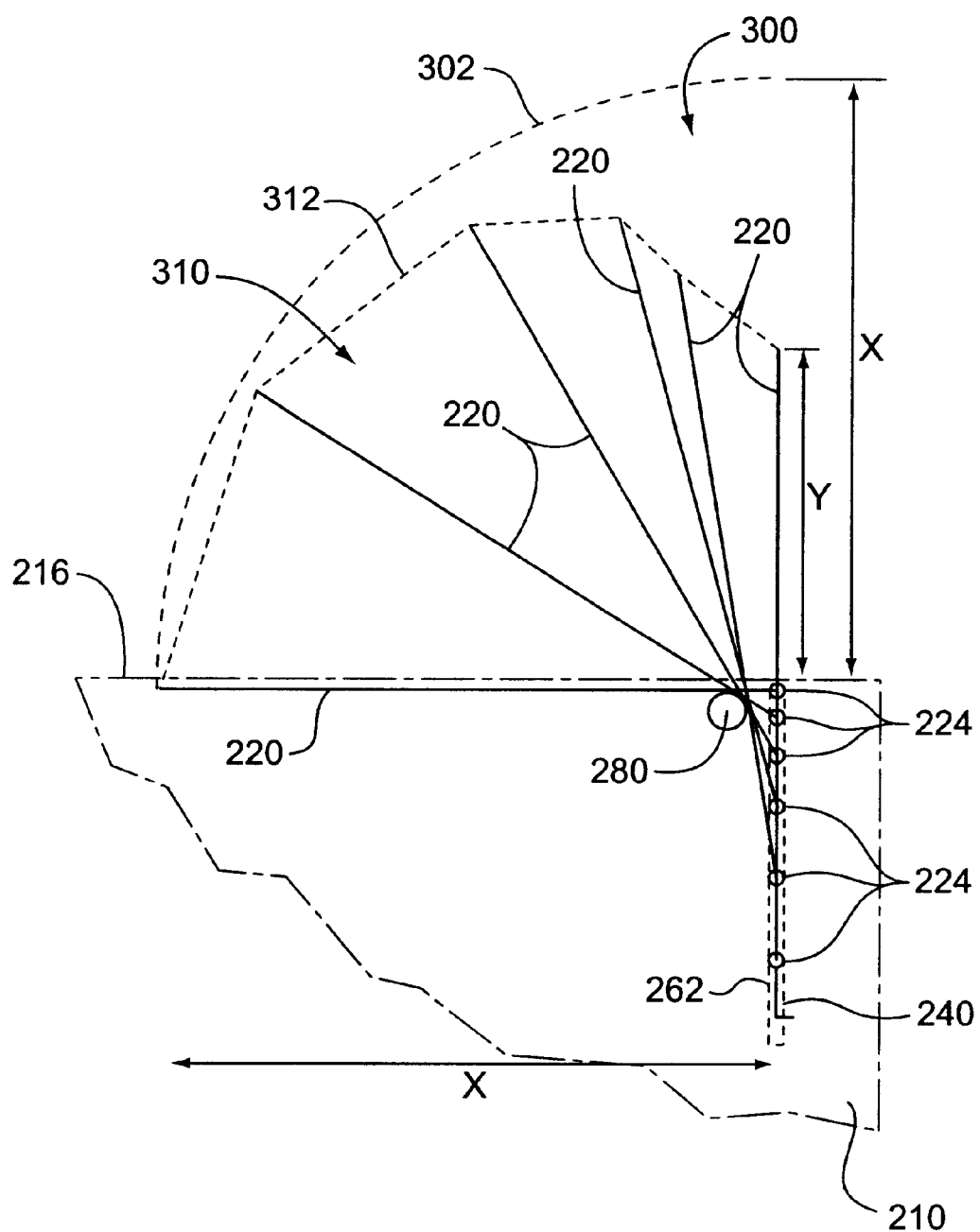
FIG. 7 illustrates a graphical representation of an arch of motion of an embodiment of the retracting door assembly.

Referring to FIG. 7, when guide 280 is close to track 262 near the front plane 216 of tape cartridge 210, retracting door 220 pivots against guide 280 until retracting door 220 is almost completely open before hinge 224 and retracting door 220 are drawn into tape cartridge 210. This configuration creates a circular arc defined by curvature 302 having a radius approximately equal to the length of the retractor door. The area required within tape drive 210 for retracting door 220 to pivot open is area 300 defined by curvature 302. Area 300 is approximately the area required within the tape drive for existing tape cartridges having horizontally pivoting doors to open.

As illustrated in FIG. 7, when the distance between track 262 and guide 280 is increased, hinge 224 is drawn further into tape cartridge 210 as retracting door 220 begins to pivot open. This decreases the length of the arc's radius X that is external to tape cartridge 210 as hinge 224 and retracting door 220 are drawn further into tape cartridge 210. When retracting door 220 is fully opened, the length Y of radius X that is external to tape cartridge 210 is less than X, decreasing the area external to tape cartridge 210 required for opening retracting door 220. The area 300 required for retracting door 220 to open is decreased to the shaded area 310 defined by curvature 312. In other words, as engaging means 240 draws hinge 224 and retracting door 220 into tape cartridge 210, hinge 224 and a portion of retracting door 220 slides along track 262 resulting is a decreased length of retracting door 220 protruding external to tape cartridge 210.

Referring to FIG. 8, when guide 280 is located next to track 262 an increased distance from the front plane 216 of tape cartridge 210, retracting door 220 is drawn into tape cartridge 210 an increased distance before coming into contact with guide 280. While engaging means 240 and hinge 224 are pushed into tape cartridge 210, retracting door 220 is drawn into tape cartridge 210 until it comes into contact with guide 280, at which point retracting door 220 pivots to a full open position. The area required for retracting door 220 to open is decreased to the shaded area 320 defined by curvature 322. Pivoting the door inside the tape cartridge reduces the area required in the tape drive to open the door for operation.

The present retracting door assembly that opens at least partially in the tape cartridge reduces the area required within the tape drive for the retracting door to pivot open, thus providing a means for reducing the length required for the next generation tape drive. The combination of a retracting door pivotally attached to an engaging means provides a means for reducing the area required to pivot the retracting door open while maintaining compatibility with existing tape drives in the field.

In the embodiments just described, the combination of an engaging means and pivoting retracting door makes the retracting door assembly compatible with existing tape drives that accept single reel tape cartridges with a horizontally pivoting door. Single reel tape cartridges with the new retracting door assembly can also be used with a more compact disk drive. Although the present retracting door assembly has been described and illustrated with on guide, additional guides could be used to control the arc the retracting door travels as the retracting door pivots open.

As to alternative embodiments, those skilled in the art will appreciate that the present retracting door assembly may be configured with alternative enclosing and engaging means without increasing the area external to the tape cartridge required for retracting the leader tab. Likewise, the present retracting door assembly may be utilized for a variety of tape cartridges.

It is apparent that there has been described, a retracting door assembly for a magnetic tape cartridge, that fully satisfies the objects, aims, and advantages set forth above. While the retracting door assembly has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A retracting door assembly for a single reel tape cartridge that consists of a housing having a cover and a base for use with a tape drive having an indentation internal to the tape drive, the assembly comprising:

a retracting door having a hinge, a guiding means integral to the tape cartridge interior cover and base, the retracting door hinge interfacing with the guiding means, and a means for engaging with the tape drive indentation, the engaging means hingedly attached to the retracting door and located in the tape cartridge perpendicular to the tape cartridge front plane, wherein when the engaging means makes contact with the tape drive indentation the engaging means is pushed into the tape cartridge housing along the guiding means and draws the retracting door into the tape cartridge housing as the retracting door pivots open.

2. The retracting door assembly of claim 1, further comprising:

a means for closing the retracting door when the tape cartridge is removed from the tape drive.

3. The retracting door assembly of claim 2, wherein the closing means is at least one spring, as the engaging means is pushed along the guiding means the at least one spring is compressed and as the tape cartridge is removed from the tape drive the compressed at least one spring exerts a force on the engaging means to close the retracting door.

4. The retracting door assembly of claim 1, wherein the engaging means is an L-shaped apparatus pivotally attached to the retracting door and interfacing with the guiding means.

5. The retracting door assembly of claim 1, further comprising:

a guide located adjacent to the guiding means, wherein the guide limits the movement of the retracting door within the tape cartridge housing as the engaging means draws the retracting door into the tape cartridge housing and the location of the guide with respect to the guiding means and the retracting door determines the area within the tape drive required to pivot the retracting door between the open and closed position.

6. The retracting door assembly of claim 1, wherein the guiding means further comprises:
- a track located on the tape cartridge housing interior cover and base and the engaging means follow the track as the engaging means is pushed into the tape cartridge housing,
- a guide located adjacent to the track to guide the retracting door as it is drawn into the tape cartridge along the track, wherein the location of the guide with respect to the track and the retracting door determines the area required within the tape drive to pivot the retracting door open.

7. A retracting door assembly for a single reel tape cartridge that consists of a housing having a cover and a base that enclose a single reel on which is would a length of tape media, the tape media having a leader tab attached thereto for use with a tape drive having an indentation internal to the tape drive, the assembly comprising:
- a retracting door having a hinge, wherein the retracing door retracts the leader tab into the tape cartridge when the tape cartridge is removed from the tape drive,
- a means for engaging with the tape drive indentation, the engaging means pivotally connected to the retracting door hinge and located in the tape cartridge perpendicular to the closed retracting door;
- a means for guiding the engaging means, the guiding means located on the interior cover and base of the tape cartridge housing and the hinge interfacing with guiding means, wherein as the tape cartridge is inserted into the tape drive the engaging means comes into contact with the indentation pushing the engaging means into the tape cartridge, the engaging means drawing the hinge and the retracting door into the tape cartridge,
- at least one spring for biasing the retracting door closed when the tape cartridge is removed from the tape drive, wherein as the engaging means is pushed into the tape cartridge the at least one spring is compressed and as the tape cartridge is removed from the tape drive the compressed at least one spring exerts a force on the engaging means pushing the retracting door closed.

8. The retracting door assembly of claim 7, wherein the guiding means further comprises:
- at least one track having a profile, wherein the hinge interfaces with the at least one track and follows the profile as the hinge and the retracting door are drawn into the tape cartridge housing,
- at least one guide located adjacent to the at least one track, wherein the at least one guide interfaces with the retracting door as it is drawn into the tape cartridge housing following the profile of the at least one track, wherein the position of the at least one guide with respect to the at least one track determines the area required within the tape drive to open and close the retracting door.

9. A method for opening and closing a single reel tape cartridge that consists of a housing that encloses a single reel, a hinged retracting door, an engaging means pivotally attached to the hinged retracting door, a track having a profile that interfaces with the hinged retracting door and a spring integrally connected to the track, as the single reel tape cartridge is inserted into a tape drive having an indentation and a stop, the method comprising:
- interfacing the engaging means with the tape drive indentation,
- pushing the engaging means into the tape cartridge housing along the track profile as the spring is compressed,
- drawing the retracting door into the tape cartridge following the engaging means as the retracting door pivots open until the tape cartridge housing reaches the tape drive stop, and
- decompressing the spring as the tape cartridge is removed from the tape drive, wherein as the spring decompresses it pushes the retracting door to the closed position.

10. A method for automatically opening and closing a door assembly on a single reel tape cartridge, the tape cartridge having a means for enclosing magnetic tape media within the single reel tape cartridge, an engaging means, a hinge pivotally connecting the enclosing means to the engaging means, a guiding means that interfaces with the hinge and a spring, as the single reel tape cartridge is inserted into a tape drive having an indentation and a stop, the method comprising:
- interfacing the engaging means with the tape drive indentation,
- pushing the engaging means into the tape cartridge along the guiding means,
- drawing the hinge and the enclosing means into the tape cartridge following the engaging means,
- compressing the spring until the tape cartridge reaches the tape drive stop, and
- decompressing the spring as the tape cartridge is removed from the tape drive, wherein as the spring decompresses it pushes the enclosing means to the closed position.

* * * * *